(12) United States Patent
Banerjee et al.

(10) Patent No.: US 7,337,128 B2
(45) Date of Patent: Feb. 26, 2008

(54) METHOD, PROGRAM, AND SYSTEM FOR RESETTING THE VALUE OF A COUPON BASED ON MARKET INFORMATION

(75) Inventors: Dwip N. Banerjee, Austin, TX (US);
Rabindranath Dutta, Austin, TX (US);
Lorin E. Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1293 days.

(21) Appl. No.: 10/042,481

(22) Filed: Jan. 9, 2002

(65) Prior Publication Data

US 2003/0130890 A1  Jul. 10, 2003

(51) Int. Cl.
*G06Q 30/00* (2006.01)

(52) U.S. Cl. ............ 705/14; 705/10; 705/26; 705/27; 235/375; 235/380; 235/381; 235/382

(58) Field of Classification Search ........... 705/14, 705/10, 26, 27; 235/375, 380, 381, 382
See application file for complete search history.

(56) References Cited

U.S. PATENT DOCUMENTS

| | | | | |
|---|---|---|---|---|
| 4,674,041 A | * | 6/1987 | Lemon et al. ............ 705/14 |
| 4,896,791 A | * | 1/1990 | Smith ..................... 221/7 |
| 5,128,861 A | * | 7/1992 | Kagami et al. ........... 705/10 |
| 5,174,224 A | * | 12/1992 | Nagy et al. ............. 108/185 |
| 5,855,007 A | | 12/1998 | Jovicic et al. |
| 5,903,874 A | | 5/1999 | Leonard et al. |
| 5,963,919 A | * | 10/1999 | Brinkley et al. .......... 705/28 |
| 5,970,469 A | | 10/1999 | Scroggie et al. |
| 5,988,346 A | * | 11/1999 | Tedesco et al. ......... 194/217 |
| 6,009,411 A | | 12/1999 | Kepecs |
| 6,041,309 A | | 3/2000 | Laor |
| 6,055,519 A | * | 4/2000 | Kennedy et al. ......... 705/80 |
| 6,185,541 B1 | | 2/2001 | Scroggie et al. |
| 6,321,208 B1 | * | 11/2001 | Barnett et al. ........... 705/14 |

OTHER PUBLICATIONS

Nina Shapiro, "Journal of Economic Issues v.34n4 pp. 990-991": Dec. 2000.*

* cited by examiner

*Primary Examiner*—Jean D. Janvier
(74) *Attorney, Agent, or Firm*—Cardinal Law Group

(57) ABSTRACT

A method and computer program for resetting the value of a coupon based on market information is provided. The program receives a request for valuation of a coupon from a retailer, accesses market demand information for a product corresponding to the coupon, determines a market demand value based on the market demand information, determines a coupon value based on the market demand value, and provides the coupon value to the retailer.

17 Claims, 7 Drawing Sheets

Product information database record

| Field 1 | Inventory at retailer |
|---|---|
| Field 2 | Minimum inventory |
| Field 3 | Maximum inventory |
| Field 4 | Sales rate |
| Field 5 | Average age of inventory |
| Field 6 | Maximum age of inventory |
| Field 7 | Competitor #1 pricing |
| Field 8 | Competitor #2 pricing |
| Field 9 | Competitor #1 inventory |
| Field 10 | Competitor #1 minimum inventory |
| Field 11 | Competitor #1 maximum inventory |
| Field 12 | Competitor #1 coupon value |
| Field 13 | Competitor #2 inventory |
| Field 14 | Competitor #2 minimum inventory |
| Field 15 | Competitor #2 maximum inventory |
| Field 16 | Competitor #2 coupon value |
| Field 17 | Last years sales rate |
| Field 18 | Last years plus 8 hours sales rate |
| Field 19 | Economic indicators |
| Field 20 | Maximum coupon value |
| Field 21 | Minimum coupon value |
| Field 22 | Minimum percent to be allocated to customer |

FIG. 3

Product demand variables percentage database record

| Field 1 | Inventory factor percentage |
|---|---|
| Field 2 | Inventory age factor percentage |
| Field 3 | Competitor #1 price factor percentage |
| Field 4 | Competitor #1 inventory factor percentage |
| Field 5 | Competitor #1 coupon value factor percentage |
| Field 6 | Competitor #2 price factor percentage |
| Field 7 | Competitor #2 inventory factor percentage |
| Field 8 | Competitor #2 coupon value factor percentage |
| Field 9 | Cyclical buying factor percentage |
| Field 10 | Economic factor percentage |

FIG. 4

METHOD, PROGRAM, AND SYSTEM FOR RESETTING THE VALUE OF A COUPON BASED ON MARKET INFORMATION

TECHNICAL FIELD OF THE INVENTION

In general, the invention relates to a method of determining a value of a discount coupon for a retail product or service.

BACKGROUND OF THE INVENTION

Discount coupons have long been distributed by manufacturers to market their products and by retail stores to attract consumers to their particular stores. For decades advertisers have issued coupons that can be taken to a redemption center, such as a retail store, and redeemed for some value or at a discount toward the purchase of an item.

In general, a marketing professional analyzes the market for a particular product or service. The analysis may include many factors including, for example, inventory, age of the product on hand, competitor pricing, and manufacturing costs. Based on the analysis, a decision is made on whether or not a discount coupon should be issued. If it is decided to issue a coupon, the value of the coupon is determined. If the value of the coupon is set too low, the customer may not be motivated to purchase the product. If the value is set too high, the amount of profit from the sale may be unacceptable. A discount coupon may be printed and distributed to perspective customers. The customer may then redeem the coupon for the determined value when purchasing the product or service.

One problem with conventional discount coupons is that there may be a considerable time delay from when the value of the coupon is set and when the coupon is redeemed. This time may range from months to years for coupons shipped with products. During the time between when the value of the coupon is set and when the coupon is redeemed, the market for the product may change. Changes in the market may result in the value of the coupon being less than optimal. One method of solving this problem commonly used by advertisers is to specify an expiration date for the discount. Setting an expiration date on a coupon has its drawbacks as well. If the time the coupon is valid is too short, the coupon may expire before it has had a chance to be effective in the market. If the time the coupon is valid is too long, the market may change resulting in the value of the coupon being less than optimal.

Another method of solving the time delay problem is implementing faster distribution technologies, for example, issuing coupons electronically over the Internet. This reduces the time delay from when the coupon value is set to when the coupon is available to a customer; however, there may still be a time delay from when the coupon is available and when the purchase is made. Additionally, this solution may only be valid if the potential customer can be targeted using the faster distribution method.

What is therefore needed is a method, which overcomes the above disadvantages.

SUMMARY OF THE INVENTION

One aspect of the invention provides a method of resetting the value of a coupon. A request for valuation of a coupon from a retailer is received. Market demand information for a product corresponding to the coupon may be accessed. A market demand value based on the market demand information may be determined. A coupon value based on the market demand value may be determined. The coupon value may be provided to the retailer. The request for valuation may be in response to a purchase. Market demand may be accessed from a database storing product sales data. Market demand information may be selected from a database including: retailer inventory, competitor pricing, current and anticipated competitor inventory, competitor advertising spending, cyclical buying trends, and economic indicators. The coupon value may be limited within a predefined range. The coupon value may be provided to the retailer in response to the request for valuation. The retailer may be the manufacturer. The market demand value comprises a percentage to be multiplied by the coupon value. A portion of the coupon value may be allocated to the customer purchasing the product. A portion of the coupon value may be allocated to the retailer.

Another aspect of the invention provides computer readable media containing computer readable code for resetting the value of a coupon. The computer readable code receives a request for valuation of a coupon from a retailer. The computer readable code accesses market demand information for a product corresponding to the coupon. The computer readable code determines a market demand value based on the market demand information. The computer readable code determines a coupon value based on the market demand value. The computer readable code may provide the coupon value to the retailer. The request for valuation may be in response to a purchase. Market demand may be accessed from a database storing product sales data. Market demand information may be selected from a database including: retailer inventory, competitor pricing, current and anticipated competitor inventory, competitor advertising spending, cyclical buying trends, and economic indicators. The coupon value may be limited within a predefined range. The coupon value may be provided to the retailer in response to the request for valuation. The retailer may be the manufacturer. The market demand value comprises a percentage to be multiplied by the coupon value. A portion of the coupon value may be allocated to the customer purchasing the product. A portion of the coupon value may be allocated to the retailer.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 is a table showing one embodiment of the fields included in a product information database record;

FIG. 4 is a table showing one embodiment of the fields included in a product demand variables percentage database record;

DETAILED DESCRIPTION OF THE PRESENTLY PREFERRED EMBODIMENTS

Figure 1:
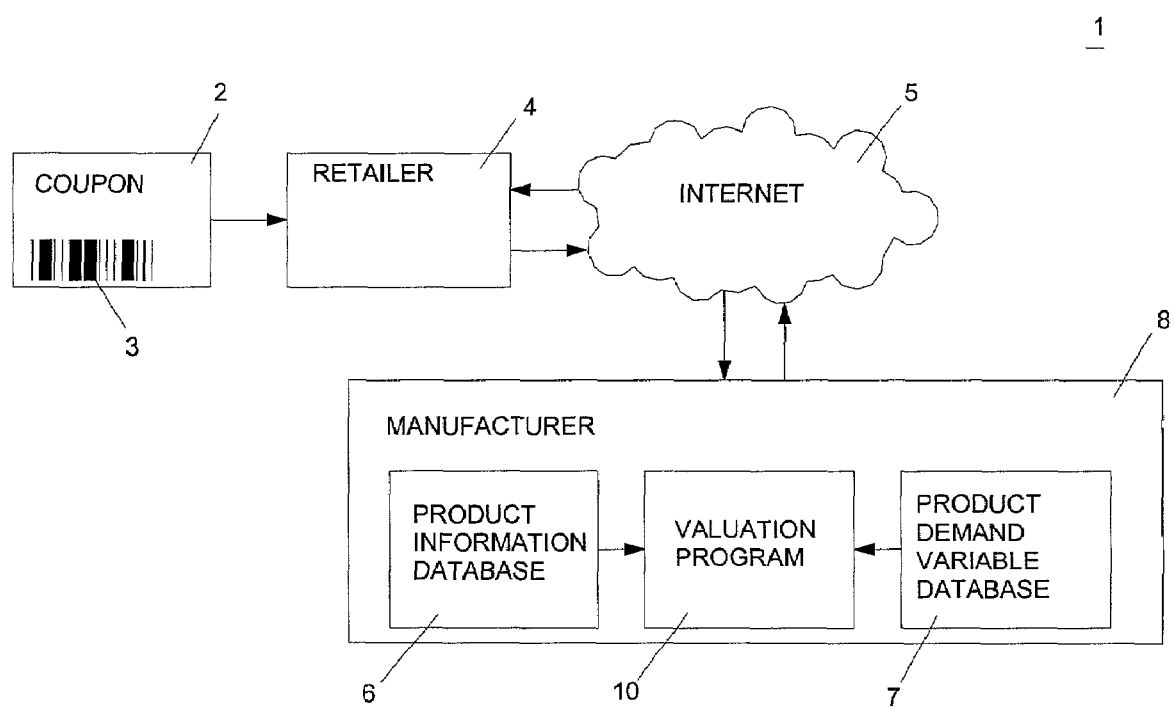
FIG. 1 is a block diagram of one embodiment of a system for resetting the value of a discount coupon, in accordance with the invention.

One embodiment of a system for resetting the value of a coupon is illustrated in FIG. 1 and designated in the aggregate as numeral 1. The system may include computer hardware and software to receive a request for valuation of a coupon from a retailer, access market demand for the product, determine the market demand value, determine the coupon value, and provide the retailer with the determined coupon value.

In one embodiment, when a customer purchases a product from a retailer, the customer may present a discount coupon for redemption 2. The coupon may include a code 3 that is readable by the retailer's computer system 4. The retailer's computer system 4 may identify the code 3 as a coupon 2 with a resetable value. The retailer's computer 4 may then compile a request for valuation code. The retailer's computer may transmit the valuation code to the manufacturer's computer 8 through the Internet 5 or other data link such as a dedicated satellite link. Upon receiving the request, the valuation program 10 may use information in a product information database 6 and a product demand variable percentage database 7 to calculate the market demand value and the coupon value. The manufacturer 8 may then send this information back to the retailer 4. The retailer's computer 4 may receive the reply and apply the percentage of the discount specified by the manufacturer 8 to the customer's purchase. Those skilled in the art will recognize that the valuation program may be resident in any computer.

Figure 2:
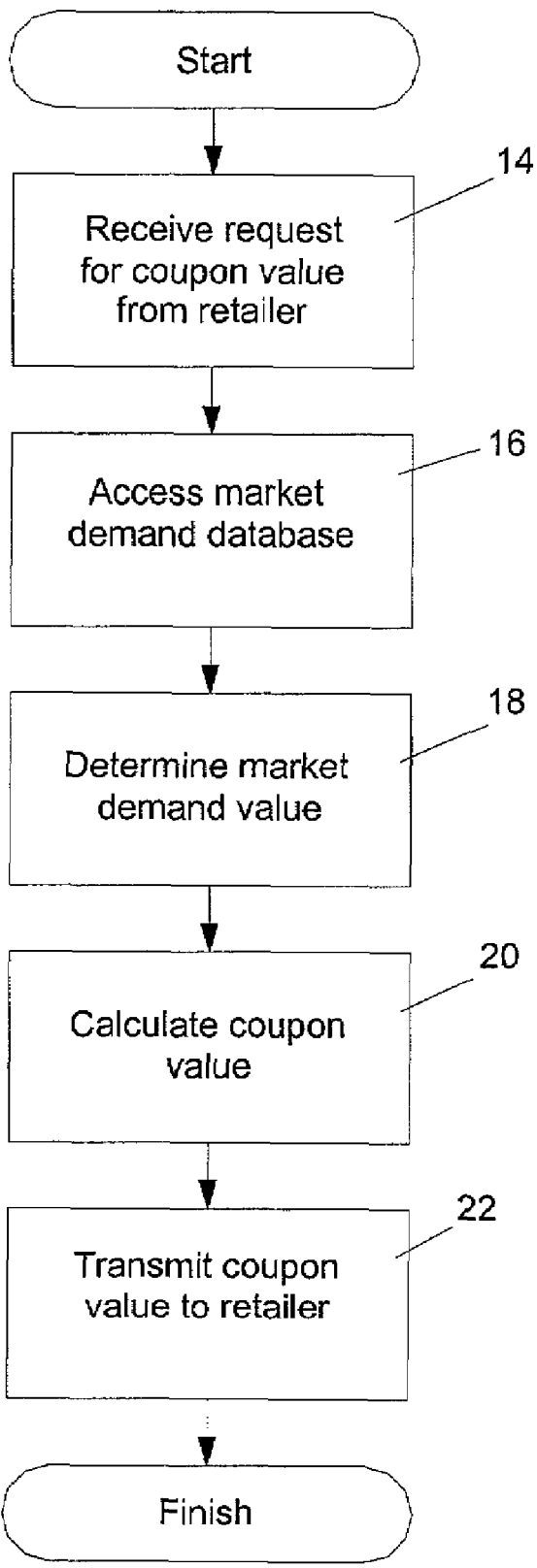
FIG. 2 is a flow chart of one embodiment of a method of resetting the value of a coupon, in accordance with the invention.

One embodiment of a computer program capable of resetting the value of a coupon based on market information is illustrated in FIG. 2 and designated in the aggregate as numeral 10. The program may receive a request for valuation of a coupon from a retailer 14, access market demand for the product 16, determine the market demand value 18, determine the coupon value 20, and provide the retailer with the determined coupon value 22.

The program may receive a request for valuation of a coupon 14 from a retailer. In one embodiment, the request for valuation may be a unique code readable by the computer program. The code may represent a request for valuation of a coupon. The code may contain coupon information including the face value, and the specific product to which the coupon pertains. The code may also contain information relating to the retailer's identity.

The program may access market demand information for the product 16. In one embodiment, the program may open a file containing product market information for the specified retailer. The file may contain a plurality of records. Each record may contain information of a specific product. Each record may contain a plurality of fields of information. One embodiment of the fields contained in a record is shown in FIG. 3. Field 1 named "Inventory at retailer" 26 may contain the quantity of the product presently at the retailer. Field 2 "Minimum inventory" 28 may contain the minimum quantity of product the retailer wishes to have available. Field 3 "Maximum inventory" 30 may contain the maximum quantity of product the retailer wishes to have available. Field 4 "Sales rate" 32 may contain the number of items sold in the previous eight business hours of the retailer. Field 5 "Average age of inventory" 34 may contain the average time the products at the retailer have been available to the retailer. Field 6 "Maximum age of inventory" 36 may contain the longest time a retailer wishes to have a particular product at the retailer. Field 7 "Competitor #1 pricing" 38 may contain the price of a comparable product offered by the closest competitor. Field 8 "Competitor #2 pricing" 40 may contain the price of a comparable product offered by the second closest competitor. Field 9 "Competitor #1 inventory" 42 may contain the amount of comparable product from the closest competitor available to the retailer. Field 10 "Competitor #1 minimum inventory" 44 may contain the minimum amount of comparable product from the closest competitor the retailer wishes to have available. Field 11 "Competitor #1 maximum inventory" 46 may contain the maximum amount of comparable product from the closest competitor the retailer wishes to have available. Field 12 "Competitor #1 coupon value" 48 may contain the discount coupon value for the comparable product from the closest competitor. Field 13 "Competitor #2 inventory" 50 may contain the amount of comparable product from the second closest competitor available to the retailer. Field 14 "Competitor #2 minimum inventory" 52 may contain the minimum amount of comparable product from the second closest competitor the retailer wishes to have available. Field 15 "Competitor #2 maximum inventory" 54 may contain the maximum amount of comparable product from the second closest competitor the retailer wishes to have available. Field 16 "Competitor #2 coupon value" 56 may contain the discount coupon value for the comparable product from the second closest competitor. Field 17 "Last year's sales rate" 58 may contain the number of items sold during the eight business hours ending at the same time last year. Field 18 "Last year's plus 8 hours sales rate" 60 may contain the number of items sold during the eight business hours starting at the same time last year. Field 19 "Economic indicators" 62 may contain a ratio of the current Consumer Price Index and the Consumer Price Index a year ago. Field 20 "Maximum coupon value" 64 may contain the maximum value of the coupon. Field 21 "Minimum coupon value" 66 may contain the minimum value for the coupon. Field 22 "Minimum percent to be allocated to customer" 68 may contain a value representing a minimum percent of the coupon value to be credited to the customer. The information in the record fields may be updated by the manufacturer's production database, the retailer's inventory database, or by manual entry performed by either the retailer or manufacturer. Those skilled in the art will recognize that the product record may also include geographical information, anticipated competitor pricing based on the number of ads placed, or any other factor associated with the sale of a product.

The program may determine the market demand value based on the market demand information 18. In one embodiment, the program may open a file containing market demand factor percentages. The file may contain a plurality of records. Each record may contain information of a specific product. Each record may contain a plurality of fields of information. One embodiment of the fields contained in a record is shown in FIG. 4. Field 1 named "Inventory factor percentage" 70 may contain the percentage that the market demand value will be based on the variable named "inventory factor". Field 2 "Inventory age factor percentage" 72 may contain the percentage that the market demand value will be based on the variable named "Inventory age factor". Field 3 "Competitor #1 price factor percentage" 74 may contain the percentage that the market demand value will be based on the variable named "Competitor #1 price factor". Field 4 "Competitor #1 inventory factor percentage" 76 may contain the percentage that the market demand value will be based on the variable named "Competitor #1 inventory factor". Field 5 "Competitor #1 coupon value factor percentage" 78 may contain the percentage that the market demand value will be based on the variable named "Competitor #1 coupon value factor". Field 6 "Competitor #2 price factor percentage" 80 may contain the percentage that the market demand value will be based on the variable named "Competitor #2 price factor". Field 7 "Competitor #2 inventory factor percentage" 82 may contain the percentage that the market demand value will be based on the variable named "Competitor #2 inventory factor". Field 8 "Competitor #2 coupon value factor percentage" 84 may contain the percentage that the market demand value will be based on the variable named "Competitor #2 coupon value factor". Field 9 "Cyclical buying factor percentage" 86 may contain the percentage that the market demand value will be based on the variable named "Cyclical buying factor". Field 10 "Economic factor percentage" 88 may contain the percentage that the market demand value will be based on the variable named "Economic factor". The sum of the percentages in Fields 1 through 10 may total 100 percent. The percentages recorded in the record fields may be updated by the manufacturer. The program may use the information in the product market information database and the market demand factor percentages database to calculate the market demand value. In one embodiment, the market demand value may be calculated using the equation:

$$\begin{aligned}\text{Market demand value} &= (\text{Inventory factor percentage } 70*\text{Inventory factor}) + (\text{Inventory age factor percentage } 72*\text{Inventory age factor}) + (\text{Competitor \#1 price factor percentage } 74*\text{Competitor \#1 price factor}) + (\text{Competitor \#1 inventory factor percentage } 76*\text{Competitor \#1 inventory factor}) + \\ &\quad (\text{Competitor \#1 coupon value factor percentage } 78*\text{Competitor \#1 coupon value factor}) + (\text{Competitor \#2 price factor percentage } 80*\text{Competitor \#2 price factor}) + (\text{Competitor \#2 inventory factor percentage } 82*\text{Competitor \#2 inventory factor}) + (\text{Competitor \#2 coupon value factor percentage } 84*\text{Competitor \#2 coupon value factor}) + (\text{Cyclical buying factor percentage } 86*\text{Cyclical buying factor}) + (\text{Economic factor percentage } 88*\text{Economic factor}).\end{aligned}$$

Whereas:

Inventory factor=(Inventory at the retailer 26−Minimum inventory 28)/(Maximum inventory 30−Minimum inventory 28). If the result of Inventory factor is negative, a value of zero should be used.

Inventory age factor=Average age of inventory 34/Maximum age of inventory 36

Competitor #1 price factor=Product price/Competitor #1 pricing 38

Competitor #1 inventory factor=(Competitor #1 inventory 42−Competitor #1 minimum inventory 44)/(Competitor #1 maximum inventory 46−Competitor #1 minimum inventory 44). If the result of Competitor #1 inventory factor is negative, a value of zero should be used.

Competitor #1 coupon value factor=Competitor #1 coupon value 48

Competitor #2 price factor=Product price/Competitor #2 pricing 40

Competitor #2 inventory factor=(Competitor #2 inventory 50−Competitor #2 minimum inventory 52)/(Competitor #2 maximum inventory 54−Competitor #2 minimum inventory 52). If the result of Competitor #2 inventory factor is negative, a value of zero should be used.

Competitor #2 coupon value factor=Competitor #2 coupon value 56

Cyclical buying factor=Last year's sales rate 58 Last year's plus 8 hours sales rate 60

Economic factor=Economic indicators 62

Those skilled in the art will recognize that different equations may be used to calculate the market demand value.

The program may determine a coupon value based on the market demand value 20. In one embodiment, the coupon value may be calculated using the equation:

$$\begin{aligned}\text{Coupon value} &= \text{Minimum coupon value } 66 + (\text{Market demand value}*((\text{Maximum coupon value } 64 - \text{Minimum coupon value } 66)/100).\end{aligned}$$ If the resulting coupon value is less than the Minimum coupon value 66, the Minimum coupon value 66 should be used. If the resulting coupon value is greater than the Maximum coupon value 64, the Maximum coupon value 64 should be used.

The program may provide the coupon value to the retailer 22. In one embodiment, the reply to the request for valuation may be a unique code readable by the retailer's computer. The code may contain the reset coupon value and the Minimum percent to be allocated to customer 68.

In one embodiment, when a customer purchases a product from a retailer, the customer may present a discount coupon 2 for redemption. The coupon 2 may include a code 3 that is readable by the retailers computer system 4. The retailer's computer 4 system may identify the code 3 as a coupon 2 with a resetable value. The retailer's computer 4 may then compile a request for valuation code. The retailer's computer 4 may transmit the valuation code to the manufacturer's computer. The code may be transmitted to the manufacturer 8 using the Internet 5.

Figure 5:
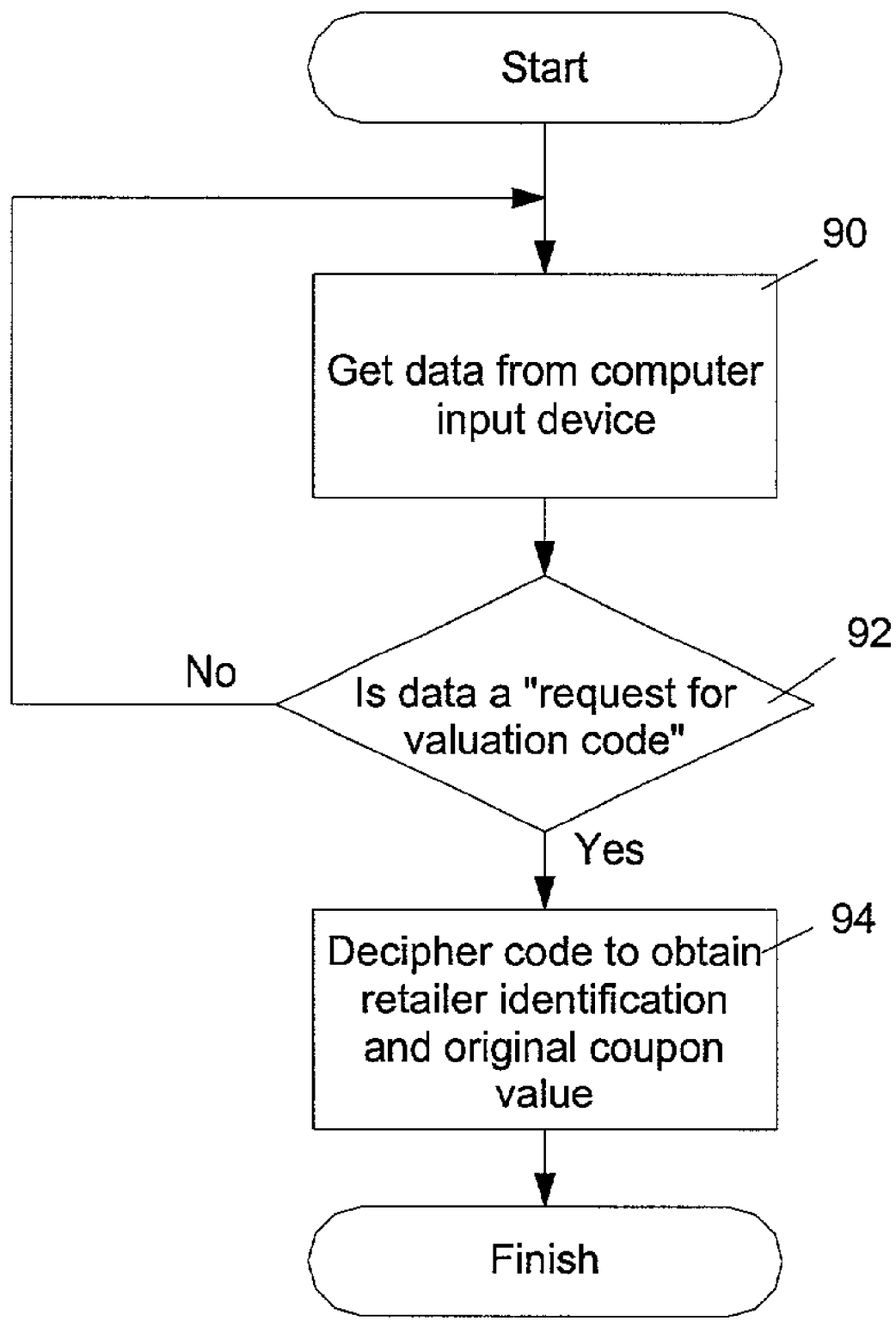
FIG. 5 is a flow chart of a routine of the procedure "receive request for coupon value from retailer" shown in the flow chart of FIG. 2.

Referring to FIG. 5, the valuation program may scan the manufacturer's computer inputs 90 for a request for valuation code. If data is received that is not a request for valuation, the valuation program ignores the data and continues to scan the input device for a valuation code 92. Upon receiving the request code, the valuation program may analysis the code to determine the retailer requesting valuation, product to which the discount is to apply, and the product 94.

Figure 6:
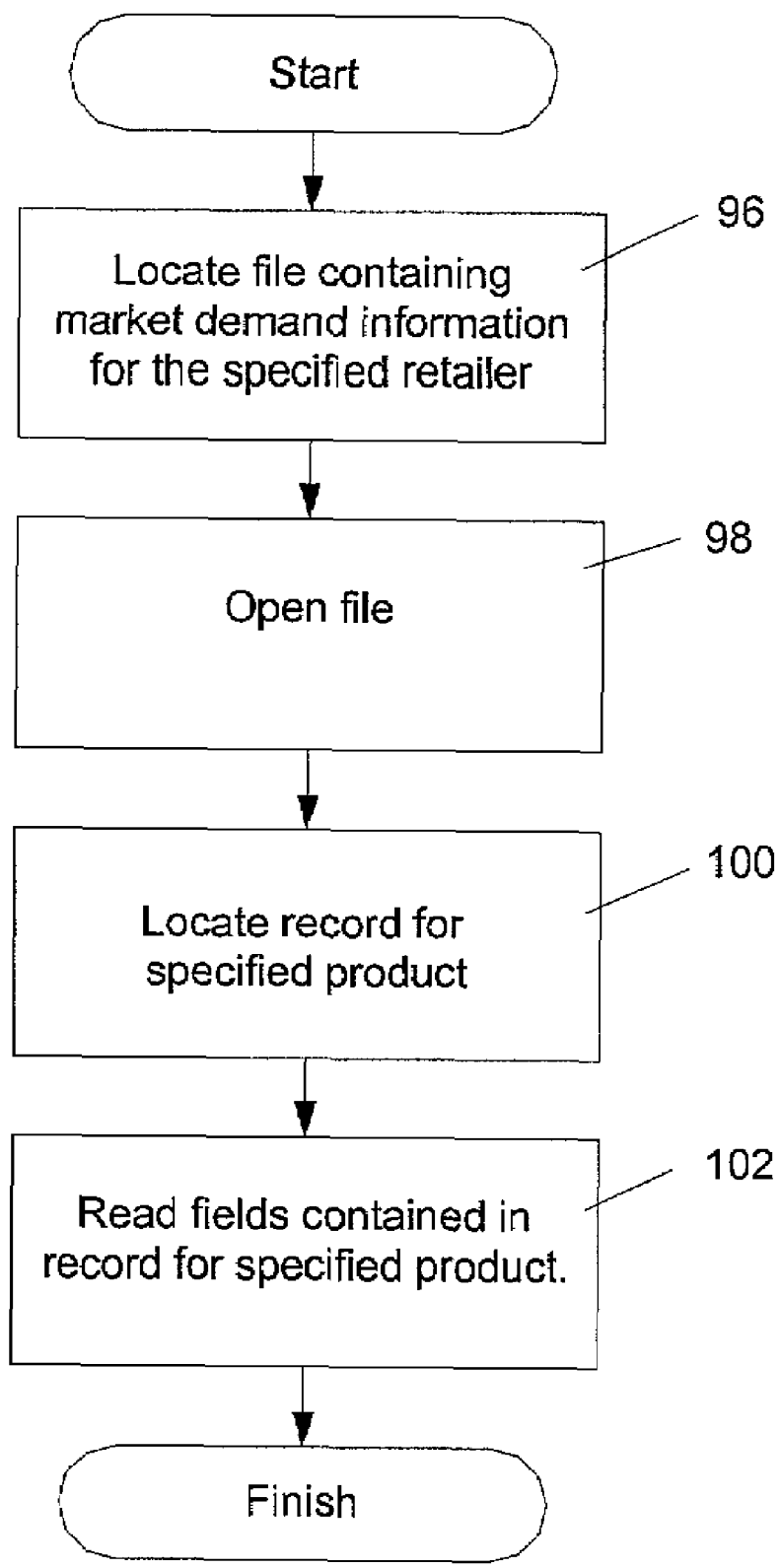
FIG. 6 is a flow chart of a routine of the procedure "Access market demand database" shown in the flow chart of FIG. 2.

Referring to FIG. 6, the valuation program may search a collection of files containing product market information for a file containing information about the retailer that submitted the request for valuation. Having located the file 96, the program may open the file 98 and search the records contained therein for the record associated with the specific product 100. Having found the record associated with the product, the valuation program may read the data contained in the record fields 102 and store them for later processing.

Figure 7:
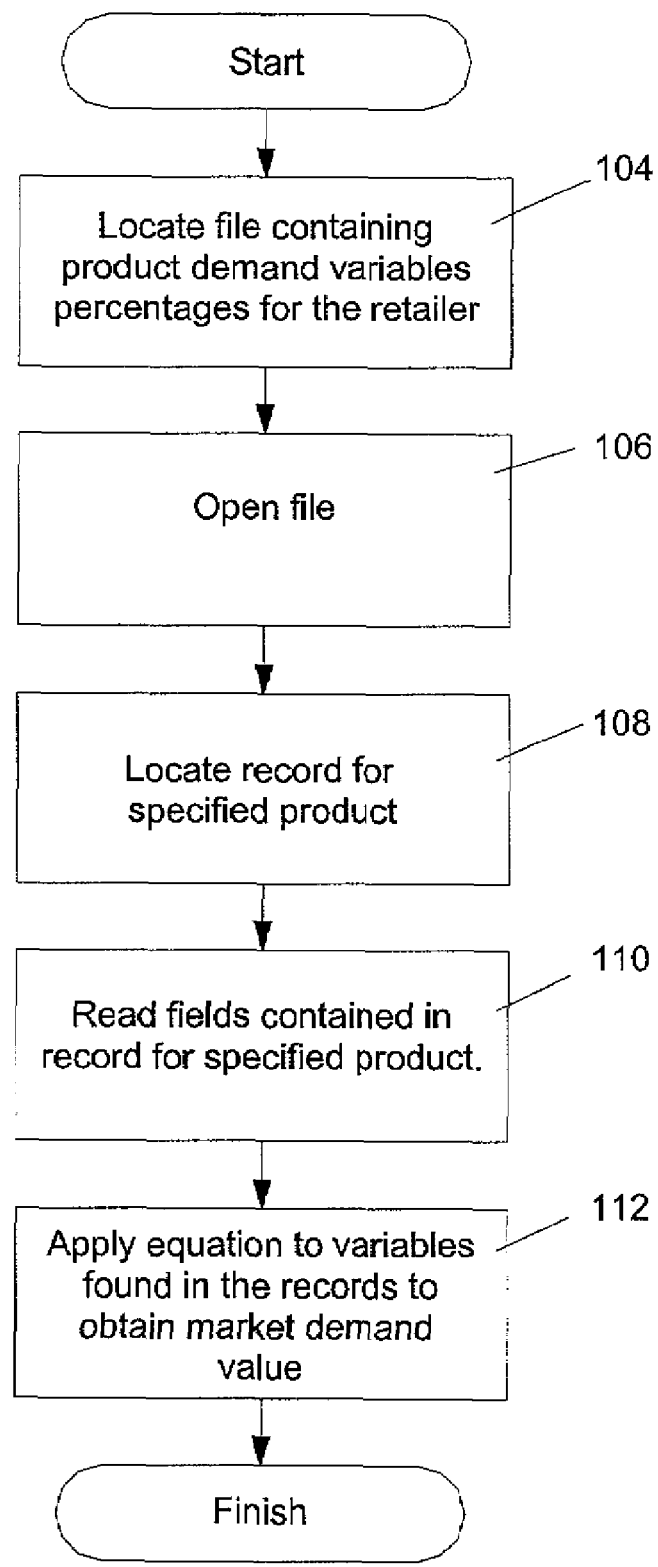
FIG. 7 is a flow chart of a routine of the procedure "Determine market demand value" shown in the flow chart of FIG. 2.
Figure 8:
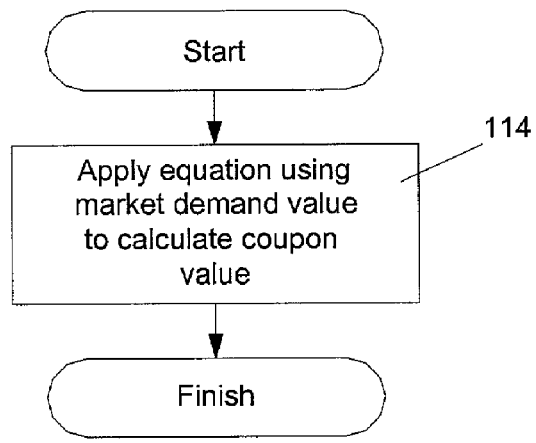
FIG. 8 is a flow chart of a routine of the procedure "Calculate coupon value" shown in the flow chart of FIG. 2.

Referring to FIG. 7, the valuation program may search a second collection of files containing product demand variable percentages for a file containing information about the retailer submitting the request for valuation. Having located the file 104, the program may open the file 106 and search the records contained therein for the record associated with the specific product. Having found the record 108 associated with the product, the valuation program may read the data contained in the record fields 110 and store them for later processing. The valuation program may apply the variables found in the records to an equation to determine the market demand value 112 for the coupon. The valuation program may then calculate the coupon value (FIG. 8) 114 using the market demand value.

Figure 9:
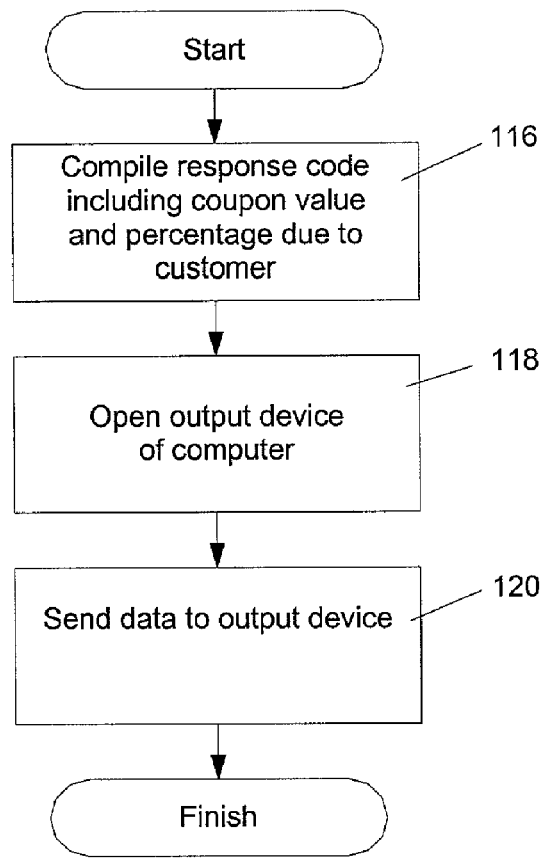
FIG. 9 is a flow chart of a routine of the procedure "transmit coupon value to retailer" shown in the flow chart of FIG. 2.

Referring to FIG. 9, the valuation program may compile a response to send to the retailer 116. The response may include the reset value of the coupon and the minimum percent of the coupon value that is to be given to the coupon. The valuation program may access the output device 118 of the manufacturer's computer and send the reply code to the output device 120. The output device may transmit the reply code to the retailer using the same method as the retailer used to transmit the request. The retailer's computer may receive the reply and apply the percentage of the discount specified by the manufacturer to the customer's purchase. Those skilled in the art will recognize that the valuation program may be resident in any computer.

While the embodiments of the invention disclosed herein are presently considered to be preferred, various changes and modifications can be made without departing them the spirit and scope of the invention. The scope of the invention is indicated in the appended claims, and all changes that come within the meaning and range of equivalents are intended to be embraced therein.

The invention claimed is:

1. A method of setting the value of a coupon comprising:
distributing at least one coupon;
receiving a request for valuation of a coupon from a retailer, after distributing the at least one coupon;
accessing market demand information for a product corresponding to the coupon in response to the request;
determining a market demand value based on the accessed market demand information wherein the market demand value is equal to (Inventory factory percentage*Inventory factor)+(Inventory age factor percentage*Inventory age factor)+(Competitor #1 price factor percentage*Competitor #1 price factor)+(Competitor #1 inventory factor percentage*Competitor #1 inventory factor)+(Competitor #1 coupon value factor percentage*Competitor #1 coupon value factor)+(Competitor #2 price factor percentage*Competitor #2 price factor)+(Competitor #2 inventory factor percentage*Competitor #2 inventory factor)+(Competitor #2 coupon value factor percentage*Competitor #2 coupon value factor)+(Cyclical buying factor percentage*Cyclical buying factor)+(Economic factor percentage*Economic factor), wherein Inventory factor=MAX [0,(Inventory at the retailer-Minimum inventory)/(Maximum inventory-Minimum inventory)], Inventory age factor is equal to Average age of inventory/Maximum age of inventory, Competitor #1 price factor=Product price/Competitor #1 pricing, Competitor #1 inventory factor=MAX[0, (Competitor #1 inventory-Competitor #1 minimum inventory)/(Competitor #1 maximum inventory-Competitor #1 minimum inventory)], Competitor #1 coupon value factor=Competitor #1 coupon value, Competitor #2 price factor=Product price/Competitor #2 pricing, Competitor #2 inventory factor=MAX[0, (Competitor #2 inventory-Competitor #2 minimum inventory)/(Competitor #2 maximum inventory-Competitor #2 minimum inventory)], Competitor #2 coupon value factor=Competitor #2 coupon value, and the Economic factor=Economic indicators;
setting a coupon value based on the market demand value wherein the coupon value is set based on the sum of a minimum coupon value and the product of market demand value multiplied by a maximum coupon value less the minimum coupon value divided by 100, such that if the determined coupon value is less than the minimum coupon value, the coupon value is determined as the minimum coupon value, and wherein if the determined coupon value is more than the maximum coupon value, the coupon value is determined as the maximum coupon value; and
providing the coupon value to the retailer.

2. The method of claim 1 wherein the request for valuation is in response to a purchase.

3. The method of claim 1 wherein market demand is accessed from a database storing product sales data.

4. The method of claim 1 wherein market demand information is selected from a database including: retailer inventory, competitor pricing, current and anticipated competitor inventory, competitor advertising spending, cyclical buying trends, and economic indicators.

5. The method of claim 1 wherein the coupon value is limited within a predefined range.

6. The method of claim 1 wherein providing the coupon value to the retailer is in response to the request for valuation.

7. The method of claim 1 further comprising: allocating at least a portion of the coupon value to the customer purchasing the product.

8. The method of claim 1 further comprising: allocating at least a portion of the coupon value to the retailer.

9. A computer readable medium containing computer readable code for setting the value of a coupon based on market information comprising:
computer readable code for receiving a request for valuation of a distributed coupon from a retailer;
computer readable code for accessing market demand information for a product corresponding to the coupon in response to the request;
computer readable code for determining a market demand value based on the accessed market demand information wherein the market demand value is equal to (Inventory factor percentage*Inventory factor)+(Inventory age factor percentage*Inventory age factor)+(Competitor #1 price factor percentage*Competitor #1 price factor)+(Competitor #1 inventory factor percentage*Competitor #1 inventory factor)+(Competitor #1 coupon value factor percentage*Competitor #1 coupon value factor)+(Competitor #2 price factor percentage*Competitor #2 price factor)+(Competitor #2 inventory factor percentage*Competitor #2 inventory factor)+(Competitor #2 coupon value factor percentage*Competitor #2 coupon value factor)+(Cyclical buying factor percentage*Cyclical buying factor)+(Economic factor percentage*Economic factor), wherein Inventory factor=MAX[0, (Inventory at the retailer-Minimum inventory)/(Maximum inventory-Minimum inventory)], Inventory age factor is ecqual to Average age of inventory/Maximum age of inventory, Competitor #1 price factor=Product price/Competitor #1 pricing, Competitor #1 inventory factor=MAX[0, (Competitor #1 inventory-Competitor #1 minimum inventory )/(Competitor #1 maximum inventory-Competitor #1 minimum inventory)], Competitor #1 coupon value factor=Competitor #1 coupon value, Competitor

2 price factor=Product price/Competitor #2 pricing, Competitor #2 inventory factor=MAX[0, (Competitor #2 inventory-Competitor #2 minimum inventory)/(Competitor #2 maximum inventory-Competitor #2 minimum inventory)], Competitor #2 coupon value factor=Competitor #2 coupon value, and the Economic factor=Economic indicators;

computer readable code for setting a coupon value based on the market demand value wherein the coupon value is set based on the sum of a minimum coupon value and the product of market demand value multiplied by a maximum coupon value less the minimum coupon value divided by 100, such that if the determined coupon value is less than the minimum coupon value, the coupon value is determined as the minimum coupon value, and wherein if the determined coupon value is more than the maximum coupon value, the coupon value is determined as the maximum coupon value; and computer readable code for providing the coupon value to the retailer.

10. The medium of claim 9 wherein the request for valuation is in response to a purchase.

11. The medium of claim 9 wherein market demand is accessed from a database storing product sales data.

12. The medium of claim 9 wherein market demand information is selected from a database including: retailer inventory, competitor pricing, current and anticipated competitor inventory, competitor advertising spending, cyclical buying trends, and economic indicators.

13. The medium of claim 9 wherein the coupon value is limited within a predefined range.

14. The medium of claim 9 wherein providing the coupon value to the retailer is in response to the request for valuation.

15. The medium of claim 9 further comprising: computer readable code for allocating at least a portion of the coupon value to the customer purchasing the product.

16. The medium of claim 9 further comprising: computer readable code for allocating at least a portion of the coupon value to the retailer.

17. A system for setting the value of a coupon based on market information comprising:

means for distributing at least one coupon: means for receiving a request for valuation of a distributed coupon from a retailer;

means for accessing market demand information for a product corresponding to the coupon in response to the request;

means for determining a market demand value based on the market demand information wherein the market demand value is equal to (Inventory factor percentage*Inventory factor)+(Inventory age factor percentage*Inventory age factor)+(Competitor #1 price factor percentage*Competitor #1 price factor)+(Competitor #1 inventory factor percentage*Competitor #1 inventory factor)+(Competitor #1 coupon value factor percentage*Competitor #1 coupon value factor)+(Competitor #2 price factor percentage*Competitor #2 price factor)+(Competitor #2 inventory factor percentage*Competitor #2 inventory factor)+(Competitor #2 coupon value factor percentage*Competitor #2 coupon value factor)+(Cyclical buying factor percentage*Cyclical buying factor)+(Economic factor percentage*Economic factor), wherein Inventory factor=MAX[0, (Inventory at the retailer-Minimum inventory)/(Maximum inventory-Minimum inventory)], Inventory age factor is equal to Average age of inventory/Maximum age of inventory, Competitor #1 price factor=Product price/Competitor #1 pricing, Competitor #1 inventory factor=MAX[0, (Competitor #1 inventory-Competitor #1 minimum inventory)/(Competitor #1 maximum inventory-Competitor #1 minimum inventory)], Competitor #1 coupon value factor=Competitor #1 coupon value, Competitor #2 price factor=Product price/Competitor #2 pricing, Competitor #2 inventory factor=MAX[0, (Competitor #2 inventory-Competitor #2 minimum inventory)/(Competitor #2 maximum inventory-Competitor #2 minimum inventory)], Competitor #2 coupon value factor=Competitor #2 coupon value, and the Economic factor=Economic indicators;

means for setting a coupon value based on the market demand value wherein the coupon value is set based on the sum of a minimum coupon value and the product of market demand value multiplied by a maximum coupon value less the minimum coupon value divided by 100, such that if the determined coupon value is less than the minimum coupon value, the coupon value is determined as the minimum coupon value, and wherein if the determined coupon value is more than the maximum coupon value, the coupon value is determined as the maximum coupon value; and means for providing the coupon value to the retailer.

* * * * *